(12) United States Patent
Kosaka et al.

(10) Patent No.: US 7,517,927 B2
(45) Date of Patent: Apr. 14, 2009

(54) FLEXIBLE POLY(ARYLENE ETHER)COMPOSITION AND ARTICLES THEREOF

(75) Inventors: Kazunari Kosaka, Mibu-Machi (JP);
Xiucuo Li, Shanghai (CN); Vijay Mhetar, Slingerlands, NY (US); Jeffery Tenenbaum, West Coxsackie, NY (US); Weiguang Yao, Moka (JP)

(73) Assignee: Sabic Innovative Plastics IP B.V. (NL)

( * ) Notice: Subject to any disclaimer, the term of this patent is extended or adjusted under 35 U.S.C. 154(b) by 134 days.

(21) Appl. No.: 10/998,524

(22) Filed: Nov. 29, 2004

(65) Prior Publication Data

US 2005/0154100 A1 Jul. 14, 2005

Related U.S. Application Data

(60) Provisional application No. 60/535,017, filed on Jan. 7, 2004.

(51) Int. Cl.
*C08K 5/49* (2006.01)
(52) U.S. Cl. .................. 524/115; 525/240; 525/236
(58) Field of Classification Search .................. 525/89, 525/240, 241, 236; 524/125
See application file for complete search history.

(56) References Cited

U.S. PATENT DOCUMENTS

| | | | |
|---|---|---|---|
| 3,361,851 | A | 1/1968 | Gowman |
| 4,145,377 | A | 3/1979 | Bussink et al. |
| 4,166,055 | A | 8/1979 | Lee, Jr. |
| 4,239,673 | A | 12/1980 | Lee, Jr. |
| 4,242,263 | A | 12/1980 | Lee, Jr. |
| 4,383,082 | A | 5/1983 | Lee, Jr. |
| 4,421,883 | A | 12/1983 | Cooper et al. |
| 4,504,613 | A | 3/1985 | Abolins et al. |
| 4,529,652 | A | 7/1985 | Bussink et al. |
| 4,584,334 | A | 4/1986 | Lee, Jr. et al. |
| 4,808,647 | A | 2/1989 | Abolins et al. |
| 4,879,330 | A | 11/1989 | De Munck et al. |
| 4,910,241 | A | 3/1990 | Abolins et al. |
| 4,945,018 | A | 7/1990 | Abolins et al. |
| 4,988,565 | A | 1/1991 | De Munck et al. |
| 5,166,264 | A | 11/1992 | Lee, Jr. et al. |
| 5,206,276 | A | 4/1993 | Lee, Jr. |
| 5,364,898 | A | 11/1994 | Lee, Jr. et al. |
| 5,397,822 | A | 3/1995 | Lee, Jr. |
| 5,455,292 | A | 10/1995 | Kakegawa et al. |
| 5,594,054 | A | 1/1997 | Lee, Jr. |
| 6,312,810 | B1 | 11/2001 | Nozaki et al. |
| 6,689,825 | B1 | 2/2004 | Bajgur et al. |
| 6,838,503 | B2 | 1/2005 | Yin et al. |
| 2002/0137840 | A1 | 9/2002 | Adedeji et al. |
| 2004/0102551 | A1 | 5/2004 | Sato et al. |
| 2004/0254270 | A1 | 12/2004 | Harashina |
| 2005/0285086 | A1 | 12/2005 | Kosaka et al. |
| 2005/0288402 | A1 | 12/2005 | Kosaka et al. |

FOREIGN PATENT DOCUMENTS

| | | |
|---|---|---|
| EP | 0 362 660 | 9/1989 |
| EP | 0 389 949 | 3/1990 |
| EP | 0 389 949 A2 * | 3/1990 |
| EP | 0 413 972 A2 * | 2/1991 |
| EP | 0413972 | 2/1991 |
| EP | 0 467 113 | 6/1991 |
| EP | 0509506 | 10/1992 |
| EP | 0639620 | 2/1995 |
| EP | 0 719 832 | 11/1995 |
| EP | 0 389 949 A2 * | 10/1998 |
| EP | 0892979 | 1/1999 |
| GB | 2043083 | 10/1980 |
| WO | 2005097900 | 10/2005 |

OTHER PUBLICATIONS

Japanese Application Pulbication No. 11-189690, Published Jul. 13, 1997, Human Translation, 22 pages.
Japanese Application Publication No. H9-87483, Published Mar. 31, 1997, Human Translation, 12 pages.
Japanese Application Publication No. 2001-139798, Published Jul. 19, 1994, Human Translation, 12 pages.
Japanese Application No. 1995-100184, Published Apr. 18, 1995, Human Translation, 13 pages.
Japanese Application No. 1995-224193, Published Aug. 22, 1995, Machine Translation, 24 pages.
Japanese Application No. 11-189686, Published Jul. 13, 1999, Human Translation, 14 pages.
Japanese Application No. 11-189685, Published Jul. 13, 1999, Human Translation, 12 pages.
Japanese Application No. 5-202267, Published Aug. 10, 1993, Human Translation, 17 pages.
Japanese Application No. 6-49314, Published Feb. 22, 1994, Human Translation, 9 pages.

(Continued)

*Primary Examiner*—Robert D. Harlan
(74) *Attorney, Agent, or Firm*—Cantor Colburn LLP (57) ABSTRACT

A flexible thermoplastic composition comprises poly(arylene ether); a plasticizer having an affinity for polyolefin; a polyolefin and a hydrogenated block copolymer of an alkenyl aromatic compound and a conjugated diene, wherein the polyolefin comprises (i) an ethylene/$C_7$-$C_{20}$ alpha olefin copolymer having an alpha olefin content greater than or equal to about 10%, (ii) a thermoplastic vulcanizate (iii) a combination of linear low density polyethylene and a thermoplastic vulcanizate, (iv) a combination of an ethylene/$C_7$-$C_{20}$ alpha olefin copolymer having an alpha olefin content greater than or equal to about 10%, a linear low density polyethylene, and a thermoplastic vulcanizate, (v) a combination of an ethylene/$C_7$-$C_{20}$ alpha olefin copolymer having an alpha olefin content greater than or equal to about 10% and a thermoplastic vulcanizate or (vi) a combination of an ethylene/$C_7$-$C_{20}$ alpha olefin copolymer having an alpha olefin content greater than or equal to about 10% and linear low density polyethylene.

23 Claims, 3 Drawing Sheets

OTHER PUBLICATIONS

Japanese Application No. 1994-100754, Published Apr. 12, 1994, Human Translation, 24 pages.
Japanese Application No. 11-12457, Published Jan. 19, 1999, Human Translation, 12 pages.
Japanese Application No. H9-30998755057, Published Feb. 12, 1997, human Translation, 13 pages.
Japanese Application No. 9-87477, Published Mar. 31, 1997, Human Translation, 12 pages.
Japanese Application No. 1-185532, Published 198907-25, Machine Translation, 43 pages.
European Patent No. 0789058, Published Sep. 29, 1999, Human Translation, 9 pages.

* cited by examiner

FLEXIBLE POLY(ARYLENE ETHER) COMPOSITION AND ARTICLES THEREOF

CROSS REFERENCE TO RELATED APPLICATION

This application claims the benefits of U.S. Provisional Patent Application Ser. No. 60/535,017 filed Jan. 7, 2004, which is fully incorporated herein by reference.

BACKGROUND OF INVENTION

This disclosure relates to flexible thermoplastic compositions. In particular, the invention relates to flexible poly (arylene ether) compositions.

Polyvinyl chloride resins have long been used as the coating resin in the coated wire and cable industry. However, there is mounting concern over the environmental impact of halogenated materials and non-halogenated alternatives are being sought. This search has met with some success in polyethylene compositions however useful polyethylene compositions typically have high levels of inorganic flame retardants that can result in deterioration of some mechanical properties and processability.

Additionally, as electronic devices become increasingly smaller and transportable there is an increasing need for the cables and wires employed as part of accessories for these devices to be more flexible and durable.

Accordingly, there is a need for a flexible thermoplastic composition with excellent mechanical properties and processability, which is important to the durability and cost effectiveness of coated wires and cables made using the flexible thermoplastic composition.

BRIEF DESCRIPTION OF THE INVENTION

The above described need is met by a flexible thermoplastic composition comprising poly(arylene ether); a polyolefin; a plasticizer having an affinity for polyolefin; and a hydrogenated block copolymer of an alkenyl aromatic compound and a conjugated diene, wherein the polyolefin comprises (i) an ethylene/$C_7$-$C_{20}$ alpha olefin copolymer having an alpha olefin content greater than or equal to about 10%, (ii) a thermoplastic vulcanizate, (iii) a combination of linear low density polyethylene and a thermoplastic vulcanizate, (iv) a combination of an ethylene/$C_7$-$C_{20}$ alpha olefin copolymer having an alpha olefin content greater than or equal to about 10%, a linear low density polyethylene, and a thermoplastic vulcanizate, (v) a combination of an ethylene/$C_7$-$C_{20}$ alpha olefin copolymer having an alpha olefin content greater than or equal to about 10% and a thermoplastic vulcanizate or (vi) a combination of an ethylene/$C_7$-$C_{20}$ alpha olefin copolymer having an alpha olefin content greater than or equal to about 10% and linear low density polyethylene.

In another embodiment an article comprises the above-described flexible thermoplastic composition.

DETAILED DESCRIPTION

The flexible thermoplastic composition comprises a poly (arylene ether); a polyolefin; a plasticizer having an affinity for polyolefin; and a hydrogenated block copolymer of an alkenyl aromatic compound and a conjugated diene, wherein the polyolefin comprises (i) an ethylene/$C_7$-$C_{20}$ alpha olefin copolymer having an alpha olefin content greater than or equal to about 10% (hereinafter referred to as ethylene/alpha olefin copolymer); (ii) a thermoplastic vulcanizate; (iii) a combination of linear low density polyethylene and a thermoplastic vulcanizate; (iv) a combination of an ethylene/alpha olefin copolymer, a linear low density polyethylene, and a thermoplastic vulcanizate; (v) a combination of an ethylene/alpha olefin copolymer and a thermoplastic vulcanizate; or (vi) a combination of an ethylene/alpha olefin copolymer and linear low density polyethylene. The composition comprises at least two phases, a polyolefin phase and a poly(arylene ether) phase. The polyolefin phase is continuous and the poly(arylene ether) phase is discontinuous or co-continuous.

The flexible composition is useful in coated wire applications where it exhibits the added advantage of being processed using similar conditions to those employed for polyvinyl chloride. In another aspect the flexible thermoplastic composition has desirable adhesion to the conductive wire.

Flexible thermoplastic compositions as described herein have a Shore A hardness, as determined by ASTM D 2240, of about 75 to about 95. Within this range the shore A hardness may be greater than or equal to about 80 or greater than or equal to about 85. Also within this range the shore A hardness may be less than or equal to about 94 or less than or equal to about 93. In some embodiments it may be desirable for the flexible composition to have a flexural modulus, as determined by ASTM D790 using bars with a thickness of 6.4 millimeters (mm), of less than or equal to about 80,000 pounds per square inch (PSI). The flexural modulus may be less than or equal to about 75,000 PSI or less than or equal to about 70,000 PSI.

Additionally, the flexible thermoplastic composition may have a tensile strength greater than or equal to 7.0 megapascals and a tensile elongation greater than or equal to about 150%. Tensile strength and elongation are both determined by ASTM D638.

The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s per se, are known polymers comprising a plurality of structural units of the formula (I):

wherein for each structural unit, each $Q^1$ is independently hydrogen, primary or secondary lower alkyl (e.g., alkyl containing up to 7 carbon atoms), phenyl, aminoalkyl, hydrocarbonoxy, or the like; and each $Q^2$ is independently hydrogen, primary or secondary lower alkyl, phenyl, hydrocarbonoxy, or the like. Preferably, each $Q^1$ is alkyl or phenyl, especially $C_{1-4}$ alkyl, and each $Q^2$ is hydrogen.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s further include combinations comprising at least one of the above.

The poly(arylene ether) generally has a number average molecular weight of about 3,000-40,000 atomic mass units (amu) and a weight average molecular weight of about 20,000-80,000 amu, as determined by gel permeation chromatography. The poly(arylene ether) may have an intrinsic viscosity of about 0.10 to about 0.60 deciliters per gram (dl/g), preferably about 0.29 to about 0.48 dl/g, as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

Poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether) for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

Based upon the foregoing, it will be apparent to those skilled in the art that the contemplated poly(arylene ether) resin may include many of those poly(arylene ether) resins presently known, irrespective of variations in structural units or ancillary chemical features.

The flexible composition may comprise the poly(arylene ether) in an amount of about 10 to about 45 weight percent (wt %), based on the total weight of the composition. Within this range the amount of poly(arylene ether) may be greater than or equal to about 15 wt %, preferably greater than or equal to about 20 wt %. Also within this range the amount of poly (arylene ether) may be less than or equal to about 45 wt %, preferably less than or equal to about 40 wt %, and more preferably less than or equal to about 35 wt %.

The polyolefin may comprise (i) ethylene/alpha olefin copolymer; (ii) a thermoplastic vulcanizate; (iii) a combination of linear low density polyethylene and a thermoplastic vulcanizate; (iv) a combination of an ethylene/alpha olefin copolymer, a linear low density polyethylene, and a thermoplastic vulcanizate; (v) a combination of an ethylene/alpha olefin copolymer and a thermoplastic vulcanizate; or (vi) a combination of an ethylene/alpha olefin copolymer and linear low density polyethylene.

The ethylene/alpha olefin copolymer is an ethylene/$C_7$-$C_{20}$ alpha olefin copolymer having an alpha olefin content greater than or equal to about 10%. The ethylene/alpha olefin copolymer are derived from ethylene polymerized with at least one comonomer selected from the group consisting of alpha-unsaturated C7 to C20 olefin comonomers and combinations of alpha-unsaturated C7 to C20 olefin comonomers. Illustrative, non-limiting examples of such alpha-unsaturated olefin comonomers used as copolymers with ethylene include 1-octene, 1-decene, 1-dodecene, styrene, alkyl-substituted styrene, and the like. Most preferably, the ethylene/alpha olefin copolymer will be ethylene/1-octene.

The comonomer content of the ethylene/alpha olefin copolymer is typically about 10 percent to about 50 percent (based on the total weight of monomers). Within this range the comonomer content may be greater than or equal to about 12 percent, preferably greater than or equal to about 15 percent. Also within this range the comonomer content may be less than or equal to about 45 percent. The comonomer is preferably randomly distributed within the copolymer molecule.

As used throughout this disclosure, the term "copolymer" refers to material resulting from the polymerization of two or more monomeric species, and specifically encompasses terpolymers (e.g., materials resulting from the polymerization of three or more monomeric species), sesquipolymers, and greater combinations of monomeric species thereof.

The densities, or specific gravities, of the resins herein disclosed were measured using ASTM D-792. The essentially linear ethylene/alpha olefin copolymer is generally characterized by a resin density of about 0.85 grams per cubic centimeter (g/cm$^3$) to about 0.91 g/cm$^3$, preferably of about 0.86 g/cm$^3$ to about 0.90 g/cm$^3$.

The "Melt Index" (MI) is a measurement of processability under low shear rate conditions, in accordance with ASTM D-1238. For the ethylene/alpha olefin copolymer, the MI is about 0.5 to about 20 decigrams per minute (dg/min). Preferably, the MI is about 0.5 to about 15 dg/min, and most preferably about 0.5 to about 10 dg/min.

The molecular weight distribution (MWD or Mw/Mn) is a ratio of the weight average molecular weight to the number average molecular weight. The ethylene/alpha olefin copolymer may have a MWD less than or equal to about 4, preferably less than or equal to about 3.5, and most preferably less than or equal to about 3. The ethylene/alpha olefin copolymer may be distinguished from LLDPE on the basis of alpha olefin content and in some cases MWD.

The ethylene/alpha olefin copolymers are preferably produced through the use of metallocene catalysts in accordance with any suitable polymerization process, including gas phase polymerization, slurry polymerization, and high pressure polymerization.

Preferred ethylene/alpha olefin copolymers are produced commercially by Exxon Chemical Company, Baytown, Tex., under the tradename EXACT, and include EXACT 8201, and EXACT 8203. Other preferred ethylene/alpha olefin copolymers are available commercially from Dow Plastics, Midland, Mich. (or DuPont/Dow), under the tradenames ENGAGE and include ENGAGE 8842, ENGAGE 8180, and ENGAGE 8150.

The flexible composition may comprise the ethylene/alpha olefin copolymer when not used in combination with other polyolefins in an amount of about 10 to about 60 weight percent, based on the total weight of the composition. Within this range the amount of ethylene/alpha olefin copolymer may be greater than or equal to about 15, preferably greater than or equal to about 20, and more preferably greater than or equal to about 25. Also within this range the amount of ethylene/alpha olefin copolymer may be less than or equal to about 60, preferably less than or equal to about 55, and more preferably less than or equal to about 50. When used in combination with other polyolefins the amount of ethylene/alpha olefin copolymer is sufficient to provide sufficient hardness and elongation, typically about 3 to about 60 weight percent, based on the total weight of the composition.

Linear low density polyethylene, as used herein, refers to an essentially linear homopolyethylene, heterogeneously branched (Ziegler polymerized) copolymer of ethylene and at least one $C_3$-$C_{20}$ alpha olefin or combination thereof having a density of about 0.91 to about 0.93. Linear low density polyethylene differs from the ethylene/alpha olefin copolymer described above in that it is heterogeneously branched and has less than 5 weight percent alpha olefin and preferably less than 3 weight percent alpha olefin, based on the total weight of the linear low density polyethylene.

The flexible composition may comprise the linear low density polyethylene in an amount of about 1 to about 35 weight percent, based on the total weight of the composition. Within this range the amount of linear low density polyethylene may be greater than or equal to about 1.5. Also within this range the amount of linear low density polyethylene may be less than or equal to about 30, preferably less than or equal to about 25.

Thermoplastic vulcanizate, as used herein, refers to a blend comprising a thermoplastic polyolefin and a partially dynamically vulcanized rubber. Examples of suitable thermoplastic polyolefins used in the thermoplastic elastomer composition are thermoplastic crystalline and semi-crystalline polyolefin homo- and copolymers or blends thereof. Examples of these are homopolymers of ethylene or propylene, copolymers of ethylene and propylene, copolymers of ethylene and an alpha olefin with 4-12 carbon atoms or copolymers of propylene and an alpha olefin with 4-12 carbon atoms. It is essential that the ethylene or propylene content in the copolymers is sufficiently high that the copolymer is semi-crystalline. This is usually achieved at an ethylene or propylene content of about 70 mol % or more. Preferably, a homopolymer of propylene is used.

Examples of rubbers that can be used in the thermoplastic vulcanizate are rubbers that are suitable for dynamic vulcanization. Examples of such rubbers are ethylene-propylene copolymers, hereinafter called EPM, ethylene-propylene-diene terpolymers, hereinafter called EPDM, styrene butadiene rubber, nitrile butadiene rubber, isobutene-isoprene rubber, styrene-ethylene/styrene-butadiene block copolymers, butyl rubber, isobutylene-p-methylstyrene copolymers or brominated isobutylene-p-methylstyrene copolymers, natural rubber or blends of these. Preferably, EPDM or EPM is used as rubber. Most preferably, EPDM is used as rubber. The EPDM preferably contains 50-70 parts by weight ethylene monomer units, 48-30 parts by weight monomer units originating from an alpha olefin and 2-12 parts by weight monomer units originating from a non-conjugated diene. A preferred alpha olefin is propylene. Preferred non-conjugated dienes include dicyclopentadiene (DCPD), 5-ethylidene-2-norbornene (ENB) or vinylnorbornene (VNB).

The dynamic vulcanization of the rubber is carried out in the presence of a suitable vulcanization agent such as, for instance, sulfur, sulfurous compounds, metal oxides, maleimides, phenol resins or peroxides. These vulcanization systems are known from the state of the art and are described in U.S. Pat. No. 5,100,947. It is also possible to use siloxane compounds as a vulcanization agent. Examples include hydrosilane or vinylalkoxysilane. The degree of vulcanization can be expressed in terms of gel content. This method is described in U.S. Pat. No. 5,100,947.

The rubber in the thermoplastic vulcanizate is at least partly vulcanized and for instance has a gel content of about 60 and about 100%. More preferably, the rubber has a gel content of about 80 and about 100%. Most preferably, the rubber is fully vulcanized and has a gel content in excess of about 95%.

Thermoplastic vulcanizates are commercially available. Exemplary thermoplastic vulcanizates includes Santoprene, available from Monsanto, Kelprox and Sarlink, available from DSM, and Trefsin available from Exxon.

The flexible composition may comprise the thermoplastic vulcanizate in an amount of about 5 to about 60 weight percent, based on the total weight of the composition. Within this range the amount of thermoplastic vulcanizate may be greater than or equal to about 10. Also within this range the amount of thermoplastic vulcanizate may be less than or equal to about 55, preferably less than or equal to about 50, and more preferably less than or equal to about 45.

The composition further comprises a hydrogenated block copolymer of an alkenyl aromatic compound and a conjugated diene. The hydrogenated block copolymer is a copolymer comprising (A) at least one block derived from an alkenyl aromatic compound and (B) at least one block derived from a conjugated diene, in which the aliphatic unsaturated group content in the block (B) is reduced by hydrogenation. The arrangement of blocks (A) and (B) includes a linear structure and a so-called radial teleblock structure having branched chains.

Preferred of these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B diblock and A-B-A triblock structures being particularly preferred.

The alkenyl aromatic compound providing the block (A) is represented by formula:

(II)

wherein $R^2$ and $R^3$ each independently represent a hydrogen atom, a $C_1$-$C_8$ alkyl group, a $C_2$-$C_8$ alkenyl group, or the like; $R^4$ and $R^8$ each independently represent a hydrogen atom, a $C_1$-$C_8$ alkyl group, or the like; and $R^5$-$R^7$ each independently represent a hydrogen atom, a $C_1$-$C_8$ alkyl group, a $C_2$-$C_8$ alkenyl group, or the like, or $R^4$ and $R^5$ are taken together with the central aromatic ring to form a naphthyl group, or $R^5$ and $R^6$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, and the like, and combinations comprising at least one of the foregoing alkenyl aromatic compounds. Of these, styrene, alpha-methylstyrene, p-methylstyrene, vinyltoluenes, and vinylxylenes are preferred, with styrene being more preferred.

Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred.

In addition to the conjugated diene, the hydrogenated block copolymer may contain a small proportion of a lower olefinic hydrocarbon such as, for example, ethylene, propylene, 1-butene, dicyclopentadiene, a non-conjugated diene, or the like.

There is no particular restriction on the content of the repeating unit derived from the alkenyl aromatic compound in the hydrogenated block copolymer. Suitable alkenyl aromatic content may be about 10 to about 90 weight percent based on the total weight of the hydrogenated block copolymer. Within this range, it may be preferred to have an alkenyl aromatic content of less than or equal to about 80 weight percent, more preferably less than or equal to about 75 weight percent, yet more preferably less than or equal to about 70 weight percent. In some embodiments it is preferable to employ two hydrogenated block copolymers that differ in their alkenyl aromatic content. An exemplary embodiment is the combination of two hydrogenated block copolymers, the first having an alkenyl aromatic content of about 25 to about 70, based on the total weight of the hydrogenated block copolymer and the second having an alkenyl aromatic content of about 10 to about 25, based on the total weight of the hydrogenated block copolymer.

There is no particular limitation on the mode of incorporation of the conjugated diene in the hydrogenated block copolymer backbone. For example, when the conjugated diene is 1,3-butadiene, it may be incorporated with about 1% to about 99% 1,2-incorporation with the remainder being 1,4-incorporation.

The hydrogenated block copolymer is preferably hydrogenated to such a degree that fewer than 50%, more preferably fewer than 20%, yet more preferably fewer than 10%, of the unsaturated bonds in the aliphatic chain moiety derived from the conjugated diene remain unreduced. The aromatic unsaturated bonds derived from the alkenyl aromatic compound may be hydrogenated to a degree of up to about 25%.

The hydrogenated block copolymer preferably has a number average molecular weight of about 5,000 to about 1,000,000 AMU, as determined by gel permeation chromatography (GPC) using polystyrene standards. Within this range, the number average molecular weight may preferably be at least about 10,000 AMU, more preferably at least about 30,000 AMU, yet more preferably at least about 45,000 AMU. Also within this range, the number average molecular weight may preferably be up to about 800,000 AMU, more preferably up to about 700,000 AMU, yet more preferably up to about 650,000 AMU.

The molecular weight distribution of the hydrogenated block copolymer as measured by GPC is not particularly limited. The copolymer may have any ratio of weight average molecular weight to number average molecular weight.

Some of these hydrogenated block copolymers have a hydrogenated conjugated diene polymer chain to which crystallinity is ascribed. Crystallinity of the hydrogenated block copolymer can be determined by the use of a differential scanning calorimeter (DSC), for example, DSC-II Model manufactured by Perkin-Elmer Co. Heat of fusion can be measured by a heating rate of, for example, 10° C./min in an inert gas atmosphere such as nitrogen. For example, a sample may be heated to a temperature above an estimated melting point, cooled by decreasing the temperature at a rate of 10° C./min, allowed to stand for about 1 minute, and then heated again at a rate of 10° C./min.

The hydrogenated block copolymer may have any degree of crystallinity. In view of a balance of mechanical strength of the resulting resin composition, those hydrogenated block copolymers having a melting point of about −40° C. to about 200° C. or having no definite melting point (i.e., having non-crystallinity), as measured according to the above-described technique, are preferred. More preferably, the hydrogenated block copolymers have a melting point of at least about 0° C., yet more preferably at least about 20° C., still more preferably at least about 50° C.

The hydrogenated block copolymer may have any glass transition temperature ($T_g$) ascribed to the hydrogenated conjugated diene polymer chain. From the standpoint of low-temperature flexibility and impact strength of the resulting resin composition, it preferably has a $T_g$ of up to about 0° C., more preferably up to about −20° C. The glass transition temperature of the copolymer can be measured by the aforesaid DSC method or from the visco-elastic behavior toward temperature change as observed with a mechanical spectrometer.

Particularly preferred hydrogenated block copolymers are the styrene-(ethylene-butylene) diblock and styrene-(ethylene-butylene)-styrene triblock copolymers obtained by hydrogenation of styrene-butadiene and styrene-butadiene-styrene triblock copolymers, respectively.

Suitable hydrogenated block copolymers include those commercially available as, for example, KRATON® G1650, G1651, G1652, and G1657 available from Kraton Polymers (formerly a division of Shell Chemical Company), and TUFTEC® H1041, H1043, H1052, H1062, H1141, and H1272 available from Asahi Chemical. Preferred hydrogenated block copolymers include the highly hydrogenated styrene-(ethylene-butylene)-styrene triblock copolymers commercially available as, for example, TUFTEC® H1043 from Asahi Chemical.

The flexible composition may comprise the hydrogenated block copolymer in an amount of about 3 to about 35 weight percent, based on the total weight of the composition. Within this range the amount of hydrogenated block copolymer may be greater than or equal to about 3, preferably greater than or equal to about 5, and more preferably greater than or equal to about 7. Also within this range the amount of hydrogenated block copolymer may be less than or equal to about 35, preferably less than or equal to about 30, and more preferably less than or equal to about 25.

The plasticizer comprises an alkylated phosphoric acid ester compound which may be a polyphosphoric acid ester compound, a monophosphoric compound or a combination of the foregoing. Without being bound by theory it is believed that the presence of the alkyl groups on the alkylated phosphoric acid ester compound improves the affinity of the alkylated phosphoric acid ester compound for the olefinic phase, particularly when the alkyl groups comprise three or more carbons. The presence of the plasticizer at least partly in the olefinic phase significantly impacts the physical properties of flexible composition, particularly the Shore A hardness.

The plasticizer may comprise a polyphosphoric acid ester compound represented by general formula III:

wherein $G^1$, $G^2$, $G^3$ and $G^4$ independently represent an alkyl group having 1 to 6 carbon atoms $R^1$, $R^2$, $R^3$ and $R^4$ independently represent a methyl group or a hydrogen atom; n represents an integer of 1 or more; n1 and n2 independently represent an integer of 0 to 2; and m1, m2, m3 and m4 independently represent an integer of 1 to 3.

$G^1$, $G^2$, $G^3$ and $G^4$ should be chosen in order to enhance miscibility or affinity for the olefinic phase. The choice of $G^{1-4}$ will depend somewhat upon the identity of the polyolefin but it is generally preferable for at least one of $G^1$, $G^2$, $G^3$ and $G^4$ in general formula III to represent a methyl group.

Heat resistance and processing properties may depend on the n value. Preferably, n represents an integer of 1 to 5. A mixture of the phosphoric acid ester compounds having different n values may be used.

The phosphoric acid ester compound contains a specific linker derived from a bis(hydroxyaryl)alkane and alkyl-substituted phenyl moieties at the terminal.

The specific bis(hydroxyaryl)alkanes useful as linker precursors include bisphenols such as bisphenol A, 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. However, they are not limited to the bisphenols. Of these, bisphenol A is preferred.

As the alkyl substituted monofunctional phenol to be used to introduce the terminal alkyl-substituted phenyl moieties, a monoalkylphenol, a dialkylphenol and a trialkylphenol may be used alone or in combination.

Preferably the polyphosphoric acid ester compound is represented by general formula IV:

wherein $G^1$, $G^2$, $G^3$ and $G^4$ independently represent an alkyl group having 1 to 6 carbon atoms; $G^{1'}$, $G^{2'}$, $G^{3'}$ and $G^{4'}$ independently represent a hydrogen atom or an alkyl group having 1 to 6 carbon atoms; and n represents an integer of 1 or more.

The volatility of the phosphoric acid ester compounds is extremely low due to the linker discussed above. Moreover, the phosphoric acid ester compound exhibits high performance not achieved by conventional polyphosphate structures wherein two or more phosphate groups are linked by hydroxyarenes such as those derived from resorcinol or a hydroquinone.

The polyphosphoric acid ester compound can be obtained by reacting the specific bifunctional phenol and the alkyl substituted monofunctional phenol with phosphorus oxychloride. Methods for obtaining the polyphosphoric acid ester compound are not limited to this method.

The plasticizer may comprise a monophosphoric acid ester compound represented by general formula V:

wherein at least three of $G^5$, $G^6$, $G^7$, $G^8$, $G^9$ and $G^{10}$ independently represent an alkyl group having 1 to 18 carbon atoms, the remainder representing a hydrogen atom or an alkyl group having 1 to 18 carbon atoms; and n3, n4 and n5 independently represent an integer of 0 to 3, and the total of n3, n4 and n5 is 3. Monophosphoric acid ester compounds include tri-cresylphosphate, trixylenylphosphate, tri(isopropylphenyl) phosphate, diisopropylphenyl phenylphosphate, tri(trimethylphenyl)phosphate, tri(t-butyl-phenyl)phosphate, tri(n-butyl-phenyl)phosphate and the like. Of these, tri(n-butyl-phenyl)phosphate is preferred.

In some embodiments, the plasticizer may comprise a polyphosphoric acid ester compound represented by formula III, a polyphosphoric acid ester compound represented by formula IV, a monophosphoric acid ester compound represented by formula V or a combination of two or more of the foregoing.

The plasticizer is generally used in an amount of about 5 to about 35, based on the total weight of the composition. Within this range the amount of plasticizer may be greater than or equal to about 6, preferably greater than or equal to about 7 and more preferably greater than or equal to about 10. Also within this range the amount of plasticizer may be less than or equal to about 32, preferably less than or equal to about 30.

In one embodiment, the flexible thermoplastic composition comprises a poly(arylene ether); a plasticizer having an affinity for polyolefin; an ethylene/alpha olefin copolymer and a hydrogenated block copolymer of an alkenyl aromatic compound and a conjugated diene. In this embodiment, the poly(arylene ether) is present in an amount of about 10 to about 45 weight percent, the plasticizer is present in an amount of about 5 to about 35 weight percent, the hydrogenated block copolymer is present in an amount of about 3 to about 35 weight percent, and the ethylene/alpha olefin copolymer is present in an amount of about 10 to about 60 weight percent, wherein the preceding amounts are based on the total weight of the composition.

In one embodiment the flexible composition comprises a poly(arylene ether); a plasticizer having an affinity for polyolefin; a hydrogenated block copolymer of an alkenyl aromatic compound and a conjugated diene, and a combination of ethylene/alpha olefin copolymer, linear low density polyethylene, and thermoplastic vulcanizate. In this embodiment, the poly(arylene ether) is present in an amount of about 10 to about 45 weight percent, the plasticizer is present in an amount of about 5 to about 35 weight percent, the hydrogenated block copolymer is present in an amount of about 3 to about 35 weight percent, ethylene/alpha olefin copolymer is present in an amount of about 5 to about 45 weight percent, the linear low density polyethylene is present in an amount of up to about 30 weight percent, and the thermoplastic vulcanizate is present in an amount of up to about 30 weight percent, wherein the preceding amounts are based on the total weight of the composition.

In one embodiment the flexible composition comprises a poly(arylene ether); a plasticizer having an affinity for polyolefin; a hydrogenated block copolymer of an alkenyl aromatic compound and a conjugated diene, and a combination of ethylene/alpha olefin copolymer, and thermoplastic vulcanizate. In this embodiment, the poly(arylene ether) is present in an amount of about 10 to about 45 weight percent, the plasticizer is present in an amount of about 5 to about 35 weight percent, the hydrogenated block copolymer is present in an amount of about 3 to about 35 weight percent, ethylene/alpha olefin copolymer is present in an amount of about 5 to about 50 weight percent, and the thermoplastic vulcanizate is present in an amount up to about 45 weight percent, wherein the preceding amounts are based on the total weight of the composition.

In one embodiment the flexible composition comprises a poly(arylene ether); a plasticizer having an affinity for polyolefin; a hydrogenated block copolymer of an alkenyl aromatic compound and a conjugated diene, and a combination of ethylene/alpha olefin copolymer and linear low density polyethylene. In this embodiment, the poly(arylene ether) is present in an amount of about 10 to about 45 weight percent, the plasticizer is present in an amount of about 5 to about 35 weight percent, the hydrogenated block copolymer is present in an amount of about 3 to about 35 weight percent, ethylene/alpha olefin copolymer is present in an amount of about 5 to about 50 weight percent, and the linear low density polyethylene is present in an amount of up to about 30 weight percent, wherein the preceding amounts are based on the total weight of the composition.

In one embodiment the flexible composition comprises a poly(arylene ether); a plasticizer having an affinity for polyolefin; a hydrogenated block copolymer of an alkenyl aromatic compound and a conjugated diene, and a combination of linear low density polyethylene, and thermoplastic vulcanizate. In this embodiment, the poly(arylene ether) is present in an amount of about 10 to about 45 weight percent, the plasticizer is present in an amount of about 5 to about 35 weight percent, the hydrogenated block copolymer is present in an amount of about 3 to about 35 weight percent, linear low density polyethylene is present in an amount of about 5 to about 35 weight percent, and the thermoplastic vulcanizate is present in an amount of about 5 to about to about 45 weight percent, wherein the preceding amounts are based on the total weight of the composition.

In one embodiment the flexible composition comprises a poly(arylene ether); a plasticizer having an affinity for polyolefin; a hydrogenated block copolymer of an alkenyl aromatic compound and a conjugated diene, and a thermoplastic vulcanizate. In this embodiment, the poly(arylene ether) is present in an amount of about 10 to about 45 weight percent, the plasticizer is present in an amount of about 5 to about 35 weight percent, the hydrogenated block copolymer is present in an amount of about 3 to about 35 weight percent, and the thermoplastic vulcanizate is present in an amount of about 10 to about 45 weight percent, wherein the preceding amounts are based on the total weight of the composition.

The components for the flexible composition may be combined under suitable conditions for the formation of an intimate blend, typically in a high shear mixing device such as an extruder or Banbury mixer. Preferably the plasticizer is added separately from the resins.

Figure 3:
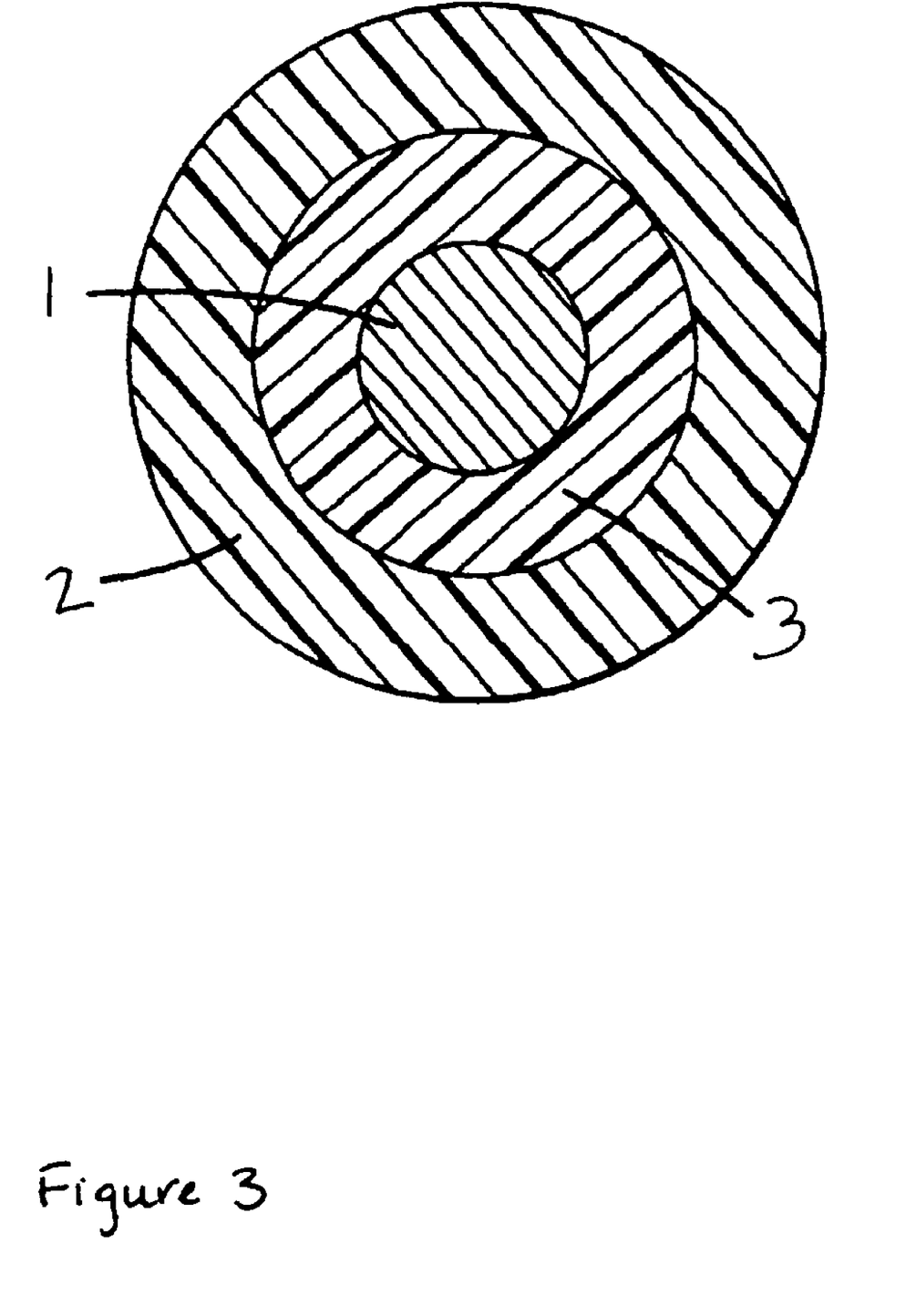
FIG. 3 is a schematic representation of a flexible coated wire.

The flexible composition may be co-extruded with the conductive wire to form a coated wire. Suitable conductive wires include, but are not limited to, copper wire, aluminum wire, lead wire, and wires of alloys comprising one or more of the foregoing metals. FIG. 3 shows a schematic representation of a coated wire having a conductive wire 1 surrounded by the flexible composition 2. An optional adhesion promoting layer 3, may be disposed between the conductive wire and flexible composition. As defined herein, conductive wire may be a single wire or a plurality of wires. In some cases, a plurality of wires may be bundled and twisted or braided, similar to yarn or rope.

The coated wire may be combined with a plug and a strain relief section (SR) to form a cord. The plug may comprise any suitable thermoplastic composition but preferably comprises a thermoplastic composition containing poly(arylene ether). In one embodiment the plug comprises about 5 to about 50 weight percent poly(arylene ether), 0 to about 50 weight percent poly(alkenyl aromatic) resin, about 1 to about 50 weight percent of a first hydrogenated block copolymer of an alkenyl aromatic compound and a conjugated diene having an alkenyl aromatic compound content greater than or equal to 25% by weight based on the weight of the hydrogenated block copolymer, about 1 to about 50 weight percent of a second hydrogenated block copolymer of an alkenyl aromatic compound and a conjugated diene having an alkenyl aromatic compound content less than 25% by weight based on the weight of the hydrogenated block copolymer, about 1 to about 50 weight percent mineral oil, and about 3 to about 50 weight percent of a non-halogenated flame retardant. Exemplary poly(alkenyl aromatic) resins include polystyrene and rubber modified polystyrene. Exemplary non-halogenated flame retardants include triphenyl phosphate, resorcinol diphosphate, bisphenol A diphosphate, diphenyl pentaerythritol diphosphate, and combinations of the foregoing.

In some embodiments it may be preferable for the ratio of the flexural modulus of the thermoplastic composition used in the coated wire to be less than or equal to the flexural modulus of the thermoplastic composition used in the plug.

Figure 2:
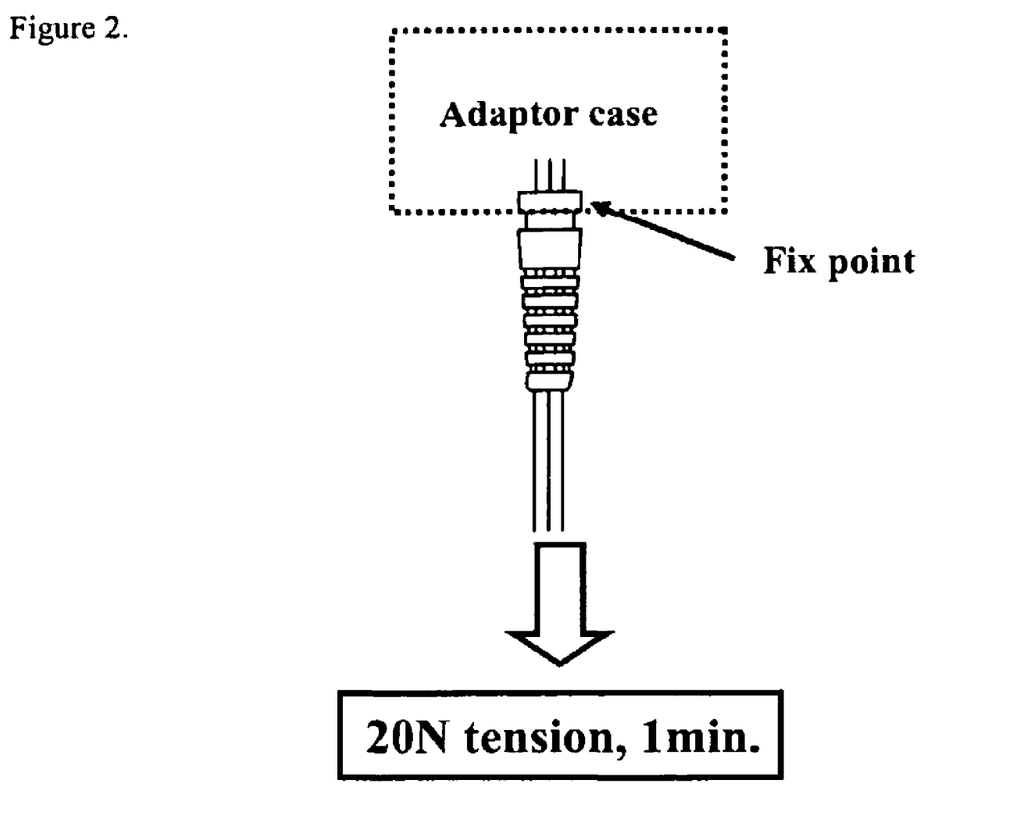
FIG. 2 is a schematic representation of a pulling out test.

Performance of the wire may be evaluated through the use of a bending test and/or pulling out test. A typical bending test as shown in FIG. 3 comprises bending a cord over a 60° or 90° arc at the plug/wire juncture at a rate of 40 cycles per minute while the wire is subjected to 500 grams in weight. The cord comprises a plug 5, a strain relief section 6, and a coated wire 7. A cable passes the bending test when after the desired number of cycles, which depends on the design and application, the conductive wires don't completely break. A typical pulling out test comprises subjecting the cable to 90 Newtons of tension for at least 1 minute as schematically depicted in FIG. 2.

The flexible thermoplastic composition and coated wire is further illustrated by the following non-limiting examples.

EXAMPLES

The following examples were prepared using the materials listed in Table 1.

TABLE 1

| Component | Description |
|---|---|
| PPE-0.33 IV | A poly(arylene ether) having an intrinsic viscosity of 0.33 dl/g as measured in chloroform at 25° C. and commercially available from GE Plastics of Pittsfield, MA. |
| PPE-0.40 IV | A poly(arylene ether) having an intrinsic viscosity of 0.40 dl/g as measured in chloroform at 25° C. and commercially available from GE Plastics of Pittsfield, MA. |
| PPE-0.46 IV | A poly(arylene ether) having an intrinsic viscosity of 0.46 dl/g as measured in chloroform at 25° C. and commercially available from GE Plastics of Pittsfield, MA. |
| KG1650 | A styrene(ethylene/butylene)styrene block copolymer having a styrene content of 32 weight percent, based on the total weight of the block copolymer and commercially available from Kraton. |
| KG1657 | A styrene(ethylene/butylene)styrene block copolymer having a styrene content of 17 weight percent, based on the total weight of the block copolymer and commercially available from Kraton. |
| Tuftec H1043 | A styrene(ethylene/butylene)styrene block copolymer having a styrene content of 67 weight percent, based on the total weight of the block copolymer and commercially available from Asahi Chemical |
| Exact 8201 | An ethylene-octene copolymer commercially available from Exxon Chemicals with melt flow index (MFI) of 1 g/10 min. |
| Exact 8210 | An ethylene-octene copolymer commercially available from Exxon Chemicals with MFI of 10 g/10 min. |
| Engage 8842 | An ethylene-octene copolymer commercially available from DuPont Dow Elastomers, MFI 20 g/10 min, density 0.857. |
| Engage 8180 | An ethylene-octene copolymer commercially available from DuPont Dow Elastomers, MFI 0.50 g/10 min, density 0.863 |
| Engage 8150 | An ethylene-octene copolymer commercially available from DuPont Dow Elastomers, MFI 0.50 g/10 min, density 0.868 |
| Kelprox 35 | An ethylene-propylene-ethylidene-norbornene terpolymer vulcanizate in a polypropylene matrix commercially available from DSM with Shore A hardness 35, density 0.90–0.94 |
| Kelprox 45 | An ethylene-propylene-ethylidene-norbornene terpolymer vulcanizate in a polypropylene matrix commercially available from DSM with Shore A hardness 45, density 0.94–1.0 |
| LLDPE | NUCG5381 available from NAGASE |
| Mineral oil | Flexon 848 available from Nippon Petro |
| 71-B | n-butylated triphenyl phosphate, Phosflex 71-B available from AKZO Nobel |
| Resorcinol disphosphate | A non-alkylated phosphoric acid ester, Fyroflex RDP available from AKZO Nobel |

Examples 1-10

Formulations as shown in Table 2 were compounded, pelletized and injection molded into the appropriate test specimens and tested for Shore A hardness according to ASTM D 2240, tensile strength and elongation according to ASTM D 638 and flexural modulus according to ASTM D790. The data for each example is shown in Table 2. Formulation amounts are in weight percent based on the total weight of the composition. Tensile strength values are in Mega Pascals (MPa) if not indicated and tensile elongation values are in percent. Flexural modulus values are in Mpa if not indicated.

TABLE 2

| Component | 1 | 2 | 3 | 4 | 5 | 6 | 7 | 8 | 9 |
|---|---|---|---|---|---|---|---|---|---|
| PPE-0.33 IV | 28 | — | — | — | — | — | — | 28 | — |
| PPE-0.40 IV | — | — | — | — | — | — | 28 | — | 28 |
| PPE-0.46 IV | — | 28 | 28 | 33 | 33 | 35 | — | — | — |
| KG1650 | 10 | 10 | 15 | 10 | 15 | 10 | 10 | 10 | 10 |
| KG1657 | — | — | — | 5 | — | 5 | 5 | 5 | — |
| Exact 8201 | 50 | 50 | 45 | 40 | — | — | 44 | — | 50 |
| Exact 8210 | — | — | — | — | — | — | — | 44 | — |
| Engage 8842 | — | — | — | — | — | — | — | — | — |
| Kelprox 35 | — | — | — | — | 17 | 30 | — | — | — |
| LLDPE | — | — | — | — | 20 | — | 1.5 | 1.5 | — |
| Mineral oil | — | — | — | — | 5 | — | — | — | — |
| 71-B | 12 | 12 | 12 | 12 | 10 | 20 | 12 | 12 | 12 |
| Results | — | — | — | — | — | — | — | — | — |
| Elongation | 282 | 390 | 282 | 235 | 179 | 186 | 246 | 365 | 282 |
| Tensile strength | 15.2 | 13.0 | 13 | 14 | 9 | 12 | 15 | 10 | 13 |
| Shore A | 93.2 | 91.5 | 92 | 93 | 92 | 93 | 90 | 87 | 93 |
| Flexural Modulus | 246 | 133 | 112 | 193 | 89 | 292 | 186 | 87 | 150 |

Examples 1-4 and 9 demonstrate compositions containing an ethylene/alpha olefin copolymer. The tensile strength of these compositions is greater than or equal to 13. The Shore A ranges from 91 to 93. The tensile elongation is greater than or equal to 235. Use of a blend of block copolymers having different styrene contents shows a decrease in elongation but an increase in flexural modulus while maintaining Shore A and tensile strength values. Examples 7 and 8 are similar to Examples 1-4 and 9 but also include a small amount of linear low density polyethylene. Examples 5 and 6 contain thermoplastic vulcanizate. Example 5 additionally contains linear low density polyethylene. This composition has a somewhat lower elongation, tensile strength and flexural modulus than Examples 1-4 and 9 but a similar Shore A.

Examples 11-23

Formulations as shown in Table 3 were compounded, pelletized and injection molded into the appropriate test specimens, and tested for Shore A hardness according to ASTM D 2240, tensile strength and elongation according to ASTM D 638, flexural modulus according to ASTM D790. The data for each example is shown in Table 3. Formulation amounts are in weight percent based on the total weight of the composition. Tensile strength values are in Mega Pascals (MPa) if not indicated and tensile elongation values are in percent. Flexural modulus values are in Mpa if not indicated.

TABLE 3

| Component | 11* | 12* | 13* | 14* | 15* | 16 | 17 | 18 | 19 | 20 | 21* | 22* | 23 |
|---|---|---|---|---|---|---|---|---|---|---|---|---|---|
| PPE-0.46 IV | 35 | 35 | 35 | 35 | 35 | 35 | 35 | 35 | 35 | 35 | 35 | 35 | 30 |
| KG1650 | 15 | 15 | 15 | 10 | 10 | 15 | 15 | 15 | 10 | 10 | 10 | — | 15 |
| Tuftec H1043 | — | — | — | — | — | — | — | — | — | — | — | 10 | — |
| Kelprox 45 | — | — | — | — | — | — | — | — | — | — | — | — | 10 |
| Engage 8842 | 30 | — | — | 30 | — | 30 | — | — | 30 | — | — | — | — |
| Engage 8180 | — | 30 | — | — | 30 | — | 30 | — | — | 30 | — | — | — |
| Engage 8150 | — | — | 30 | — | — | — | — | 30 | — | — | — | — | — |
| LLDPE | — | — | — | — | — | — | — | — | — | — | 30 | 30 | 20 |
| Resorcinol diphosphate | 20 | 20 | 20 | 25 | 25 | — | — | — | — | — | — | — | — |
| 71B | — | — | — | — | — | 20 | 20 | 20 | 25 | 25 | 25 | 25 | 25 |
| Results | — | — | — | — | — | — | — | — | — | — | — | — | — |
| Shore A | >96 | >96 | >96 | >96 | >96 | 91 | 93 | 93 | 91 | 93 | >96 | >96 | 93 |
| Tensile strength PSI | 1811 | 1827 | 1671 | 935 | 865 | 1956 | 2269 | 2378 | 1774 | 1869 | 2092 | 2386 | 1510 |
| Elongation | 91 | 72 | 60 | 29 | 23 | 130 | 160 | 191 | 164 | 160 | 153 | 104 | 270 |
| Flexural modulus PSI | 57083 | 63426 | 62903 | 50317 | 52630 | 46289 | 59477 | 59966 | 21430 | 38560 | 56732 | — | — |

*Comparative examples

Comparative Examples 11-15 demonstrate that the use of a plasticizer that does not have an affinity for polyolefin (RDP) results in a non-flexible composition (a Shore A greater than 95), even at fairly high levels of loading. Comparative Examples 21 and 22 show that compositions comprising LLDPE as the only polyolefin component also show a Shore A value of greater than 95 indicating that only some polyolefin materials or combinations of polyolefin materials can be used in flexible compositions.

Examples 40-41

Figure 1:
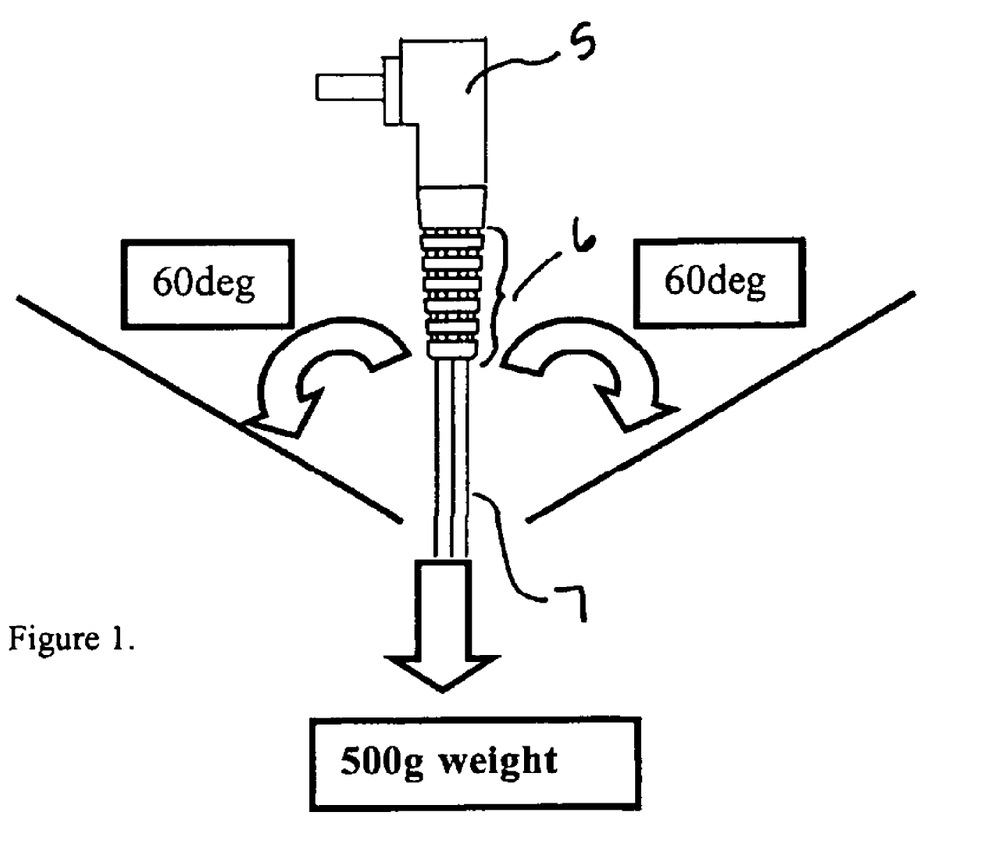
FIG. 1 is a schematic representation of a bending test.

Poly(arylene ether), a hydrogenated block copolymer of an alkenyl aromatic compound and a conjugated diene, poly(ethylene-octene), an aromatic phosphate plasticizer, and about 1 weight percent additives were compounded to form a sheathing composition and pelletized. The composition is shown in Table 5. Amounts are in weight percent, based on the total composition. The pellets were dried at 70° C. for about 5 hrs. The sheathing composition was then coextruded with copper wire at a winding speed of up to about 132 meters per minute to form a coated copper wire having a size of 1.8×3.6 millimeters (mm) with a 0.4 mm plastic sheath. The wire was then joined with a plug and a SR (stress relief) to form a cord and tested for bending and pulling out performance. The bending test comprised bending the cable comprising the wire over a 60° arc at the plug/wire juncture at a rate of 40 cycles per minute while the wire is subjected to 500 grams in weight as schematically depicted in FIG. 1. A cable passes the bending test if the conductive wires did not completely break after at least 1000 cycles testing depending on the plug design. The pulling out test comprised subjecting the cable to 90 Newtons of tension for at least 1 minute as schematically depicted in FIG. 2. Results are shown in Table 6.

TABLE 5

| Component | Amount |
| --- | --- |
| PPE-0.46 IV | 27.7 |
| KG1650 | 9.9 |
| Exact 8201 | 49.5 |
| 71-B | 11.9 |

TABLE 6

| Sheathing material flexural modulus (Mpa) | Plug/SR material flexural modulus (Mpa) | PlugBending test spec. | Bending test (Cycles) |
| --- | --- | --- | --- |
| 230 | 170 | 1000 (L-type plug) | 3059 |
| 230 | 170 | 2000 (I-type plug) | 4020 |

Examples 40 and 41 show that cords made using the flexible composition described here demonstrate excellent bending performance, far exceeding the required 1000 cycles, indicating excellent durability.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A flexible coated wire comprising a conductive wire and a flexible thermoplastic composition coating or sheath wherein the flexible thermoplastic composition comprises:
   poly(arylene ether);
   a plasticizer having an affinity for polyolefin;
   a polyolefin; and
   a hydrogenated block copolymer of an alkenyl aromatic compound and a conjugated diene,
   wherein the polyolefin comprises
     (i) an ethylene/$C_7$-$C_{20}$ alpha olefin copolymer having an alpha olefin content greater than or equal to about 10%,
     (ii) a thermoplastic vulcanizate;
     (iii) a combination of linear low density polyethylene and a thermoplastic vulcanizate,
     (iv) a combination of an ethylene/$C_7$-$C_{20}$ alpha olefin copolymer having an alpha olefin content greater than or equal to about 10%, a linear low density polyethylene, and a thermoplastic vulcanizate,
     (v) a combination of an ethylene/$C_7$-$C_{20}$ alpha olefin copolymer having an alpha olefin content greater than or equal to about 10% and a thermoplastic vulcanizate or
     (vi) a combination of an ethylene/$C_7$-$C_{20}$ alpha olefin copolymer having an alpha olefin content greater than or equal to about 10% and linear low density polyethylene.

2. A flexible cable comprising:
   a flexible coated wire comprising a conductive wire and a flexible thermoplastic composition coating or sheath; and
   a plug/SR, wherein the flexible thermplastic composition comprises:
   poly(arylene ether);
   a plasticizer having an affinity for polyolefin;
   a polyolefin; and
   a hydrogenated block copolymer of an alkenyl aromatic compound and a conjugated diene,
   wherein the polyolefin comprises
     (i) an ethylene/$C_7$-$C_{20}$ alpha olefin copolymer having an alpha olefin content greater than or equal to about 10%,
     (ii) a thermoplastic vulcanizate;
     (iii) a combination of linear low density polyethylene and a thermoplastic vulcanizate,
     (iv) a combination of an ethylene/$C_7$-$C_{20}$ alpha olefin copolymer having an alpha olefin content greater than or equal to about 10%, a linear low density polyethylene, and a thermoplastic vulcanizate,
     (v) a combination of an ethylene/$C_7$-$C_{20}$ alpha olefin copolymer having an alpha olefin content greater than or equal to about 10% and a thermoplastic vulcanizate or
     (vi) a combination of an ethylene/$C_7$-$C_{20}$ alpha olefin copolymer having an alpha olefin content greater than or equal to about 10% and linear low density polyethylene.

3. The flexible cable of claim 2 wherein the plug/SR comprises a poly(arylene ether) composition.

4. The flexible cable of claim 2 wherein the plug/SR comprises:
   about 5 to about 50 weight percent poly(arylene ether);
   0 to about 50 weight percent poly(alkenyl aromatic) resin;
   about 1 to about 50 weight percent of a first hydrogenated block copolymer of an alkenyl aromatic compound and a conjugated diene having an alkenyl aromatic compound content greater than or equal to 25% by weight based on the weight of the hydrogenated block copolymer;
   about 1 to about 50 weight percent of a second hydrogenated block copolymer of an alkenyl aromatic compound and a conjugated diene having an alkenyl aromatic compound content less than 25% by weight based on the weight of the hydrogenated block copolymer;
   about 1 to about 50 weight percent mineral oil; and about 3 to about 50 weight percent of a non-halogenated flame retardant.

5. The flexible coated wire of claim 1, wherein the flexible thermoplastic composition has a Shore A value of about 75 to about 95 as determined by ASTM D 2240.

6. The flexible coated wire of claim 1, wherein the flexible thermoplastic composition has a tensile strength greater than or equal to 7 megapascals as determined by ASTM D638.

7. The flexible coated wire of claim 1, wherein the flexible thermoplastic composition has a tensile elongation greater than or equal to about 150% as determined by ASTM D638.

8. The flexible coated wire of claim 1, wherein the flexible thermoplastic composition has a flexural modulus of less than or equal to about 80,000 PSI as determined by ASTM D790.

9. The flexible coated wire of claim 1, wherein the poly (arylene ether) is present in the flexible thermoplastic composition in an amount of about 10 to about 45 weight percent, based on the total weight of the composition.

10. The flexible coated wire of claim 1, wherein the hydrogenated block copolymer of an alkenyl aromatic compound and a conjugated diene is present in the flexible thermoplastic composition in an amount of about 3 to about 35, based on the total weight of the composition.

11. The flexible coated wire of claim 1, wherein the plasticizer is present in the flexible thermoplastic composition in an amount of about 5 to about 35 based on the total weight of the composition.

12. The flexible coated wire of claim 1, wherein the hydrogenated block copolymer of an alkenyl aromatic compound and a conjugated diene is a styrene-(ethylene-butylene)-styrene triblock copolymer.

13. The flexible coated wire of claim 1, wherein the plasticizer comprises an alkylated phosphoric acid ester compound.

14. The flexible coated wire of claim 1, wherein the plasticizer is butylated triphenyl phosphate.

15. The flexible coated wire of claim 1, wherein the ethylene/$C_7$-$C_{20}$ alpha olefin copolymer has a molecular weight distribution less than or equal to about 4.

16. The flexible coated wire of claim 1, wherein the linear low density polyethylene has a density of about 0.91 to about 0.93 g/cm$^3$.

17. The flexible coated wire of claim 1, wherein the linear low density polyethylene has less than 5 weight percent alpha olefin based on the total weight of the linear low density polyethylene.

18. The flexible coated wire of claim 1, wherein the thermoplastic vulcanizate comprises a rubber that is at least partly vulcanized and has a gel content of about 60 and about 100%.

19. The flexible coated wire of claim 1, wherein the polyolefin is an ethylene/$C_7$-$C_{20}$ alpha olefin copolymer having an alpha olefin content greater than or equal to about 10% and the polyolefin is present in an amount of about 10 to about 60% based on the total weight of the composition.

20. The flexible coated wire of claim 1, wherein the polyolefin is a combination of linear low density polyethylene and a thermoplastic vulcanizate and the linear low density polyethylene is present in an amount of about 5 to about 35% based on the total weight of the composition and the thermoplastic vulcanizate is present in an amount of about 5 to about 45% on the total weight of the composition.

21. The flexible coated wire of claim 1, wherein the polyolefin is a combination of an ethylene/$C_7$-$C_{20}$ alpha olefin copolymer having an alpha olefin content greater than or equal to about 10%, a linear low density polyethylene, and a thermoplastic vulcanizate and the an ethylene/$C_7$-$C_{20}$ alpha olefin copolymer is present in an amount of about 5 to about 45% based on the total weight of the composition, the linear low density polyethylene is present in an amount of up to about 30% based on the total weight of the composition and the thermoplastic vulcanizate is present in an amount of up to about 30% based on the total weight of the composition.

22. The flexible coated wire of claim 1, wherein the polyolefin is a combination of an ethylene/$C_7$-$C_{20}$ alpha olefin copolymer having an alpha olefin content greater than or equal to about 10% and a thermoplastic vulcanizate and the ethylene/$C_7$-$C_{20}$ alpha olefin copolymer is present in an amount of about 5 to about 50% based on the total weight of the composition and the thermoplastic vulcanizate is present in an amount of up to about 45% based on the total weight of the composition.

23. The flexible coated wire of claim 1, wherein the polyolefin is a combination of an ethylene/$C_7$-$C_{20}$ alpha olefin copolymer having an alpha olefin content greater than or equal to about 10% and linear low density polyethylene and the ethylene/$C_7$-$C_{20}$ alpha olefin copolymer is present in an amount of about 5 to about 50% based on the total weight of the composition and the linear low density polyethylene is present in an amount of up to about 30% based on the total weight of the composition.

* * * * *